June 23, 1959 — V. L. SMITHERS — 2,891,354

FLOWER HOLDER WITH DETACHABLE BASE

Filed July 11, 1957

INVENTOR.
VERNON L. SMITHERS

ATTORNEYS

United States Patent Office 2,891,354
Patented June 23, 1959

2,891,354

FLOWER HOLDER WITH DETACHABLE BASE

Vernon L. Smithers, Akron, Ohio, assignor to The V. L. Smithers Manufacturing Company, Kent, Ohio, a corporation of Ohio Application July 11, 1957, Serial No. 671,162

4 Claims. (Cl. 47—41)

This invention relates to a flower holder having a body of absorbent foam held within a cage of substantially rigid material, and this application is a continuation in part of my copending application Serial No. 593,990, filed June 26, 1956.

As in said application Serial No. 593,990, the absorbent foam may be made from any well-known synthetic resins which are suitable for supporting the stems of flowers, and the cage is substantially rigid but easily deformable to adapt its shape to various configurations, and may be of soft metal or molded plastic material.

However, the cage of application Serial No. 593,990 is open on the base side to allow insertion and removal of the block of foam, and preferably has a base ring extending laterally outward around the base side. Hence, if the flower holder of said application is placed with its base side abutting a supporting surface such as a table, said supporting surface must be protected from the moisture within the foam by placing the holder within a dish or container. If the holder is hung upon a wall to hold a flower arrangement, a protective shield of some kind is required to protect the wall from the moisture.

The purpose of the present invention is to provide a disk-like base, which is easily attached to and removed from the cage, and which retains the foam within the cage and at the same time prevents contact between the moist foam and a supporting surface. The base may be quickly removed and the cage with the enclosed foam saturated placed in an open dish or vase if desired.

Other objects are to provide a simple and economical base construction which will contain excess moisture draining from the block when the holder is in upright position.

Various modifications and changes in construction are intended to be within the scope of the invention as defined in the appended claims.

In the drawings, in which a preferred embodiment of the invention is shown by way of example:

The block of absorbent foam is indicated generally at 10 and is preferably substantially cylindrical in form with two parallel end faces 11 and 12.

The block 10 is composed of a synthetic resin in the form of a permanent foam made by blowing various types of organic resins, and particularly synthetic resins such as phenolic condensation products, of which phenol molding plastics known as "Bakelite" are an example. Other similar resins, which are adaptable to the foaming process and when subjected to heat will cure or set into a rigid form which is hydrophilic or water-absorbent, may be used. Urea-formaldehyde foams have been employed.

The preferred type of foam is one which is composed of a great multitude of inter-connected cells so as to be highly hydrophilic, and phenolic foam is ideal for this purpose while the other foams referred to have this property in lesser degrees.

The ability of the usable foams to absorb water is greatly enhanced if the foam is treated with a wetting agent either before it is dipped in water or during the immersion. Many types of wetting agents are adaptable, that known as "Igepal CO-530" (alkyl phenoxy polyoxyethylene ethanol) being especially well adapted for the purpose. Polyglycol ether and the various alkyd-aryl sulfonates or artificial soaps may also be used.

The skeleton cage having substantially the configuration of a man's high crown silk hat fits closely around the block of foam 10, and is made of substantially rigid material which is easily deformable. Preferably, the cage material is a molded plastic such as a synthetic resin, but it may be of soft metal if desired.

Figure 1:
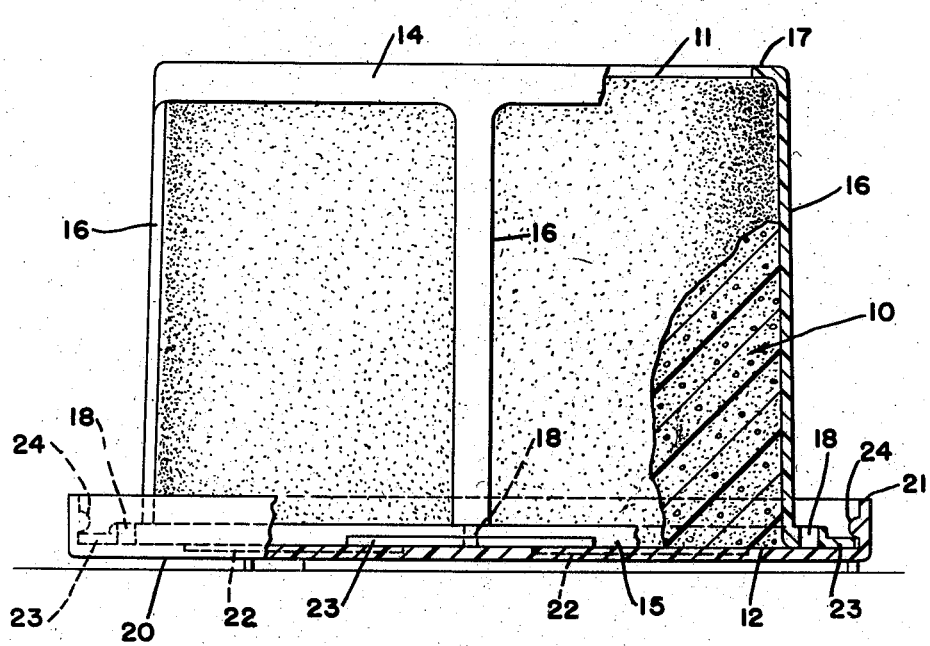
Fig. 1 is a side elevation of the improved holder, partly broken away and in section.
Figures 2, 3:
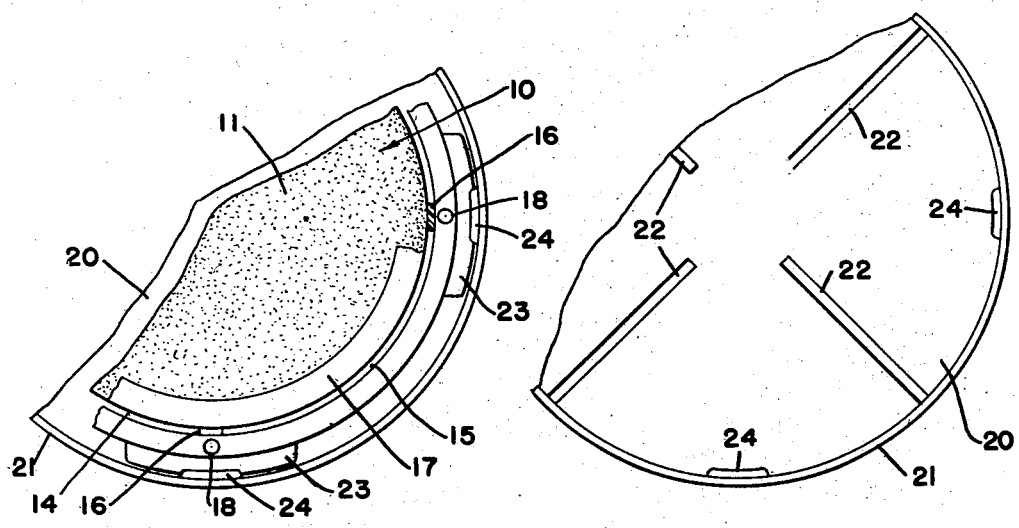
Fig. 2 is a fragmentary plan view thereof, partly in section.
Fig. 3 is a fragmentary plan view of the base detached from the cage.

Referring to Figs. 1 and 2 the cage preferably comprises an upper ring or rim member 14 and a lower ring or rim flange 15 spaced therefrom, and connected thereto by ribs or bars 16 at circumferential intervals. The ring 14 has an annular flange 17 overlying and abutting the outer edge of the end face 11 of the block 10, and the ribs 16 fit against the sides of the block and are preferably slightly tapered to facilitate entering the block into the cage without crushing its outer edges.

The upper ring 14 protects the upper edge of the block 10, and the lower outturned ring 15 protects the lower edge without obstructing insertion or removal of the block. The ring 15 may be provided at intervals with holes 18, preferably adjacent the ribs 16, to facilitate attaching wire or thread for hanging the cage on a wall or window or the like. The undersurface of the base ring 15 is flat and the bottom face of the block 10 is preferably cut to lie in the same plane, so that when placed in a dish or container, the holder is supported in a stable position.

As shown in Figs. 1 and 2, the cage is adapted to fit within and rest upon a disk-like base 20 having an annular upturned rim flange 21 making the base saucer-like in shape. The base 20 is substantially flat for firmly supporting the base ring 15 and the bottom face of block 10, and preferably has radial grooves 22 therein for conducting water inwardly of the base of the block to facilitate more rapid absorption of the water by the block.

The base ring 15 of the cage is provided at circumferential intervals with outwardly extending ribs 23 for fitting within rim flanges 21 and for cooperating with inwardly directed ribs 24 formed on the rim flange 21 to form bayonet locking means detachably holding the base 20 on the base ring of the cage. The ribs 23 preferably have their undersurfaces flush with the undersurface of the ring 15, and the ribs 24 are spaced above the disk wall 20 a distance substantially equal to the height of ribs 23, so that when the ribs 23 are rotated in abutment with disk wall 20 they will be frictionally engaged and locked by the ribs 24. Preferably, the ribs 24 and the ends of ribs 23 are rounded to facilitate sliding engagement therebetween.

The base 20 is quickly and easily detached from the cage by rotating the base sufficiently to disengage the ribs 24 from the ribs 23, and just as easily attached to the cage by reversing the process. Thus the block of foam 10 can be quickly replaced whenever desired. Moreover, the flower arranger can remove or attach the base at will, depending upon where the holder is to be supported, and whether the cage is to be deformed to conform to shape of a vase or container.

When the base is attached, it retains the block of foam and any excess of moisture, provides a flat support for the holder on a table top or the like, and protects supporting surfaces from moisture within the block. The cage and base are simple and economical to construct, and the device is adapted for easy and effective use by anyone.

What is claimed is:

1. A moisture-retaining flower holder for cut flowers comprising a block of water-absorbent synthetic resin foam, a substantially rigid skeleton cage conforming to the block and having an open end through which the block is removable, an outturned base ring at said open end, a disk-like base for abutting said base ring, and cooperating means on said base and base ring for detachably locking said base to said ring, whereby said block of foam is not removable without detaching the base.

2. A moisture-retaining flower holder for cut flowers comprising a block of water-absorbent synthetic resin foam, a substantially rigid skeleton cage conforming to the block and having an open end through which the block is removable, an outturned base ring at said open end, a saucer-like base for abutting said base ring and having an annular rim, and cooperating means on said rim and said base ring for detachably locking said base to said base ring, whereby said block of foam is not removable without detaching the base.

3. A moisture-retaining flower holder for cut flowers comprising a block of water-absorbent synthetic resin foam, a substantially rigid skeleton cage conforming to the block and having an open end through which the block is removable, an outturned base ring at said open end, a disk-like base for abutting said base ring and having grooves for conducting water inwardly of the block of foam, and cooperating means on said base and base ring for detachably locking said base to said ring, whereby said block of foam is not removable without detaching the base.

4. A moisture-retaining flower holder for cut flowers comprising a block of water-absorbent synthetic resin foam, a substantially rigid skeleton cage of molded plastic material conforming to the block and having an open end through which the block is removable, an outturned base ring at said open end, an annular flange at the opposite end of said cage overlying said block of foam, a disk-like base for abutting said base ring, and cooperating means on said base and base ring for detachably locking said base to said ring, whereby said block of foam is not removable without detaching the base.

References Cited in the file of this patent

UNITED STATES PATENTS

| | | |
|---|---|---|
| D. 26,106 | Douglass | Sept. 29, 1896 |
| 31,306 | Eberhardt | Feb. 5, 1861 |
| 153,715 | Landers | Aug. 4, 1874 |
| 1,492,050 | Stuck | Apr. 29, 1924 |
| 2,637,143 | Reynolds | May 5, 1953 |
| 2,753,277 | Smithers | July 3, 1956 |

FOREIGN PATENTS

| | | |
|---|---|---|
| 211,275 | Switzerland | Nov. 18, 1940 |